US012334251B2

(12) United States Patent
Imazato et al.

(10) Patent No.: US 12,334,251 B2
(45) Date of Patent: Jun. 17, 2025

(54) CURRENT TRANSFORMER AND METHOD OF MANUFACTURING THE SAME

(71) Applicant: SHT Corporation Limited, Izumisano (JP)

(72) Inventors: Yuichi Imazato, Izumisano (JP); Kazuhiro Kasatani, Izumisano (JP); Kazusa Mori, Izumisano (JP)

(73) Assignee: SHT Corporation Limited, Osaka (JP)

( * ) Notice: Subject to any disclaimer, the term of this patent is extended or adjusted under 35 U.S.C. 154(b) by 761 days.

(21) Appl. No.: 17/630,283

(22) PCT Filed: Jun. 23, 2020

(86) PCT No.: PCT/JP2020/024549
§ 371 (c)(1),
(2) Date: Jan. 26, 2022

(87) PCT Pub. No.: WO2021/019963
PCT Pub. Date: Feb. 4, 2021

(65) Prior Publication Data
US 2022/0277892 A1 Sep. 1, 2022

(30) Foreign Application Priority Data
Jul. 31, 2019 (JP) ................................ 2019-140979

(51) Int. Cl.
*H01F 27/24* (2006.01)
*H01F 3/14* (2006.01)
(Continued)

(52) U.S. Cl.
CPC ............ *H01F 27/346* (2013.01); *H01F 3/14* (2013.01); *H01F 27/008* (2013.01);
(Continued)

(58) Field of Classification Search
CPC ........ H01F 27/346; H01F 3/14; H01F 27/008; H01F 27/245; H01F 27/263;
(Continued)

(56) References Cited

U.S. PATENT DOCUMENTS 3,803,479 A 4/1974 Rathor
4,827,237 A 5/1989 Blackburn
5,317,300 A * 5/1994 Boesel ................ H01F 41/005 29/609

FOREIGN PATENT DOCUMENTS

JP S53-107817 2/1977
JP S53-121413 3/1977
(Continued)

OTHER PUBLICATIONS

China National Intellectual Property Administration "Office Action" for corresponding Chinese patent application No. 202080054871.5, dated May 31, 2024 (with English translation), 15 pp.
(Continued)

*Primary Examiner* — Tuyen T Nguyen
(74) *Attorney, Agent, or Firm* — Eckert Seamans Cherin & Mellott, LLC

(57) ABSTRACT

The present invention provides a current transformer having excellent temperature characteristics and realizing high-precision adjustment of the output voltage via gap adjustment and small tolerance, and a method for manufacturing the same. The core component for current transformers of the present invention, comprises an E-type core 40 formed of an electromagnetic steel sheet and having three legs 41, 42, 41 extending substantially parallel to each other and a connecting part 43 connected at each end of the legs, and an I-type core 50 formed of an electromagnetic steel sheet and having the same length as the connecting portion, the I-type
(Continued)

(a) Sheared Surfaces Facing Each Other / Fractured Surfaces Facing Each Other (b) Sheared Surface and Fractured Surface Facing Each Other core being placed on and bonded to the connecting part of the E-type core to form a single-piece core component.

5 Claims, 16 Drawing Sheets

(51) Int. Cl.

| | |
|---|---|
| ***H01F 27/00*** | (2006.01) |
| ***H01F 27/245*** | (2006.01) |
| ***H01F 27/26*** | (2006.01) |
| ***H01F 27/28*** | (2006.01) |
| ***H01F 27/34*** | (2006.01) |
| ***H01F 41/02*** | (2006.01) |

(52) U.S. Cl.
CPC ......... *H01F 27/245* (2013.01); *H01F 27/263* (2013.01); *H01F 41/0233* (2013.01)

(58) Field of Classification Search
CPC .... H01F 41/0233; H01F 27/02; H01F 27/306; H01F 27/325; H01F 38/30; H01F 41/02; H01F 30/10
USPC .................................. 336/83, 212, 233–234
See application file for complete search history.

(56) References Cited

FOREIGN PATENT DOCUMENTS

| | | |
|---|---|---|
| JP | S63-18824 | 2/1988 |
| JP | H0864428 | 3/1996 |
| JP | H08213255 | 8/1996 |
| JP | H8-250320 | 9/1996 |
| JP | H11-186061 | 7/1999 |
| JP | 2005203445 | 7/2005 |
| JP | 2018163952 | 10/2018 |
| KR | 2009-0131144 A | 12/2009 |

OTHER PUBLICATIONS

European Patent Office "extended European search report" for corresponding European Patent Application No. 20847083.1, dated Aug. 4, 2023, 10 pp.

Japanese Patent Office "International Search Report" from Japanese priority application PCT/JP2020/024549, Aug. 25, 2020 (Aug. 25, 2020), 5 pp.

* cited by examiner (a)

(b)

(a)

(b)

CURRENT TRANSFORMER AND METHOD OF MANUFACTURING THE SAME

TECHNICAL FIELD

This invention relates to a current transformer used in various AC equipment and adapted to detect electric currents flowing in the equipment to provide output control and overcurrent protection operation of the equipment and a method of manufacturing the same.

BACKGROUND ART

A current transformer is used to detect electric currents in high-power electric instruments such as air conditioners and IH devices that operate on household power supplies. A current transformer comprises a primary coil, a secondary coil, and a core for forming a magnetic path common to these coils (see, for example, Patent Document 1). In the current transformer, a current-sensing resistor is connected to the secondary coil, and the power supply commercial frequency of the instruments is energized to the primary coil. When the current in the primary coil changes, the magnetic field in the secondary coil changes through a magnetic circuit, creating a potential difference at both ends of the current-sensing resistor in the secondary coil. The difference is detected as a voltage at the current-sensing termination resistor. The instrument inputs the voltage into the microcomputer to control the inverter circuit, etc., to thereby controlling the input to or output from the instrument.

The core of a current transformer is composed of laminated iron cores made of electromagnetic steel sheets. For example, Patent Document 1 discloses in FIG. 6 that E-shaped iron cores (E-type cores) and I-shaped iron cores (I-type cores) are alternately stacked to form a magnetic path. The leakage flux is reduced and the magnetic efficiency is increased by alternately stacking E-type cores and I-type cores, i.e., stacking them in different directions. And the decrease in secondary output voltage due to the increase in primary current is suppressed. However, a gap that is formed between the junction surfaces of E-type core and I-type core varies. Therefore, there was a problem of variation in the secondary output voltage. On the other hand, it is necessary to use resin or varnish to fix E-type core and I-type core with one another. Still, the resin or varnish expands or contracts thermally depending on temperature change, resulting in that variation of the secondary output voltage increases. Thus, the current transformer does not have sufficient temperature characteristics.

Patent Document 1 discloses a coil shown in FIGS. 1 and 2 wherein E-type cores are alternately stacked such that tips of each leg overlap, without alternately interposing I-type cores between E-type cores. Such a current transformer has no gap between E-type and I-type cores and is not affected by thermal expansion and contraction, thus having good temperature characteristics.

PRIOR ART DOCUMENT(S)

Patent Document

Patent Document 1: Japanese Utility Model Application Publication SHO.63-18824

SUMMARY OF THE INVENTION

Problems to be Solved by the Invention

The circuit breaker regulates the amount of electric current that can be used for electrical devices by a household power supply. Therefore, for operating such electrical appliances at their maximum output, it is necessary to detect the current values and control them so that the sum of the current values of these devices does not exceed the maximum current value of the circuit breaker. At this time, if there is an error in the current value detected by the current transformer, the electrical devices are required to operate at a lower total current value in anticipation of safety. For this reason, there is a need for a current transformer that can detect the current value accurately and increase the output of electrical equipment to the maximum within the range that does not exceed the maximum current value of the breaker.

However, the current transformer shown in FIGS. 1 and 2 of Patent Document 1 has no I-type core, and the leg tips of the E-type core are open, thus increasing the leakage flux between the legs, causing faster magnetic saturation. As a result, as the primary current increases, the drop in the secondary output voltage becomes larger. Therefore, the core had to be sized up.

The output voltage can be adjusted also by changing the gap spacing between E-type and I-type cores. However, the current transformer disclosed in Patent Document 1 does not have a gap, so it is impossible to adjust the output voltage. In addition, considering variations in the material magnetic properties of the core and variations in temperatures during the heat treatment process to anneal the core, it was necessary to set larger tolerances for the secondary output voltage (e.g., ±3% to 5% of the actual measured value).

An object of the present invention is to provide a current transformer having excellent temperature characteristics and realizing high-precision adjustment of the output voltage via gap adjustment and small tolerance, and a method for manufacturing the same.

Means to Solve the Problems

In accordance with the present invention, a core component for current transformers comprises, an E-type core formed of an electromagnetic steel sheet and having three legs extending substantially parallel to each other and a connecting part connected at each end of the legs, and an I-type core formed of an electromagnetic steel sheet and having the same length as the connecting portion, the I-type core being placed on and bonded to the connecting part of the E-type core to form a single-piece core component.

In accordance with the present invention, a current transformer comprises, a resin-made bobbin with a through hollow section, the bobbin having a primary coil and a wire-wound secondary coil, a core consisting of E-type cores and I-type cores provided in the hollow section of the bobbin, wherein each E-type core is formed of an electromagnetic steel sheet and has three legs extending substantially parallel to each other and a connecting part connected at each end of the legs, and each I-type core is formed of an electromagnetic steel sheet and has the same length as the connecting portion, and wherein E-type cores are stacked with its central leg alternately in opposite directions, and I-type cores are placed between the connecting parts of the stacked E-type cores, wherein the core is a stack structure of the core components mentioned above, and each of the core components is inserted into the hollow section alternately from a first direction and a second direction opposite to the first direction.

In the current transformer as mentioned above, the core is a stack structure of core components inserted into the hollow section alternately from a first direction and a second direction opposite to the first direction, wherein each of the core components comprises E-type core formed of an electromagnetic steel sheet made by press-punching process and having three legs extending substantially parallel to each other and a connecting part connected at each end of the legs, and I-type core formed of an electromagnetic steel sheet made by press-punching process and having the same length as the connecting portion, wherein the I-type core is placed on and bonded to the connecting part of the E-type core to form a single-piece structure of the E-type core and the I-type core, wherein each of the core components is inserted into the hollow section from a first direction and a second direction opposite to the first direction alternately while interchanging the top and bottom of the core component to form a single core component block, and the E-type core and the I-type core opposed to the E-type core are preferably arranged such that press-punched directions are in the opposite direction.

In the present current transformer, end faces of the E-type core and the I-type core that were prepared by the press-punching process have a rounded, slope shaped, sheared surface on their corners, a sheared surface with striations formed in the thickness direction, a fractured surface with unevenness as if the steel sheet was plucked, and a jagged burrs protruding from the end face in the punching direction, the E-type core and the I-type core of each core component are arranged such that the sheared surface and the fractured surface are opposed to each other.

The core components stacked in the hollow section of the bobbin can be combined in a single core component block.

Core components inserted into the hollow section of the bobbin from the first direction can be combined into a single core component block. Core components inserted into the hollow section of the bobbin from the second direction can be combined into a single core component block.

A method of manufacturing a current transformer according to the present invention comprises:

a core component preparing step of preparing core components consisting of a combination of E-type cores and I-type cores wherein each E-type core is formed of an electromagnetic steel sheet and has three legs extending substantially parallel to each other and a connecting part connected at each end of the legs, and each I-type core is formed of an electromagnetic steel sheet and has the same length as the connecting portion, and the I-type core is placed on and bonded to the connecting part of the E-type core to form a single-piece core component;

a bobbin preparing step of preparing a resin-made bobbin with a through hollow section, the bobbin having a primary coil and a wire-wound secondary coil;

a stacking step of inserting central legs of the E-type core into the hollow section of the bobbin alternately from a first direction and a second direction opposite the first direction to form a stack of the core components; and a block forming step of combining the stacked core components into a single core component block.

The foregoing method of manufacturing a current transformer preferably comprises a core component preparing step of preparing a single-piece core component consisting of E-type core and I-type core wherein the E-type core is formed by press-punching an electromagnetic steel sheet and has three legs extending substantially parallel to each other and a connecting part connected at each end of the legs, and the I-type core is formed by press-punching an electromagnetic steel sheet and has the same length as the connecting portion, the I-type core being placed on and bonded to the connecting part of the E-type core;

a bobbin preparing step of preparing a resin-made bobbin with a through hollow section, the bobbin having a primary coil and a wire-wound secondary coil; and a stacking step of stacking the core component by inserting central legs of the E-type core of the single-piece core component into the hollow section of the bobbin alternately from a first direction and a second direction opposite the first direction while interchanging the top and bottom of the core component alternately, such that the E-type core and the I-type core are stacked in the opposite direction of the respective press-punched directions.

The foregoing method of manufacturing a current transformer preferably comprises a gap adjusting step after the stacking step and before the block forming step, the gap adjusting step comprising adjusting a spacing of the gap formed between distal ends of legs of the E-type core inserted from the first direction and end edges of the I-type core inserted from the second direction and the gap formed between distal ends of legs of the E-type core inserted from the second direction and end edges of the I-type core inserted from the first direction, by pressing the stacked core components from the first direction and/or the second direction.

The gap adjusting step preferably adjusts the gap while referring to the output voltage characteristics.

Effects of the Invention

In accordance with the present invention, the E-type core and I-type core of the core component are bonded to form a single-piece component so that the core component can be easily handled and easily inserted into the bobbin of the current transformer.

In accordance with the present invention, the current transformer is adapted to adjust a gap formed between distal ends of legs of the E-type core of the core component inserted from a first direction and end edges of the I-type core of the core component inserted from a second direction, and a gap formed between the distal ends of legs of the E-type core of the core component inserted from the second direction and end edges of the I-type core of the core component inserted from the first direction. This adjustable gap structure realizes the high-precision adjustment of the output voltage and the possible minor tolerance.

In accordance with the present invention, the method of manufacturing the current transformer includes a step that the E-type core and the I-type core are bonded to form a single-piece core component. Therefore, the single-piece core components can be inserted into the hollow section of the bobbin from the first direction and the second direction and then combined into a single core component block to thereby achieving the increased efficiency of manufacturing the current transformer.

In accordance with the present invention, the current transformer is configured to adjust a spacing of the gap formed between distal ends of legs of the E-type core of the core component inserted from a first direction and end edges of the I-type core of the core component inserted from a second direction, and a spacing of the gap formed between the distal ends of legs of the E-type core of the core component inserted from the second direction and end edges of the I-type core of the core component inserted from the first direction. This adjustable gap structure realizes the high-precision adjustment of the output voltage and the possible small tolerance.

MODE FOR CARRYING OUT THE INVENTION

Core components 31 used for current transformers (hereinafter referred to as "core components"), current transformer 10, and current transformer module 12 of one embodiment of the present invention will be explained below with reference to the drawings.

Figure 1:
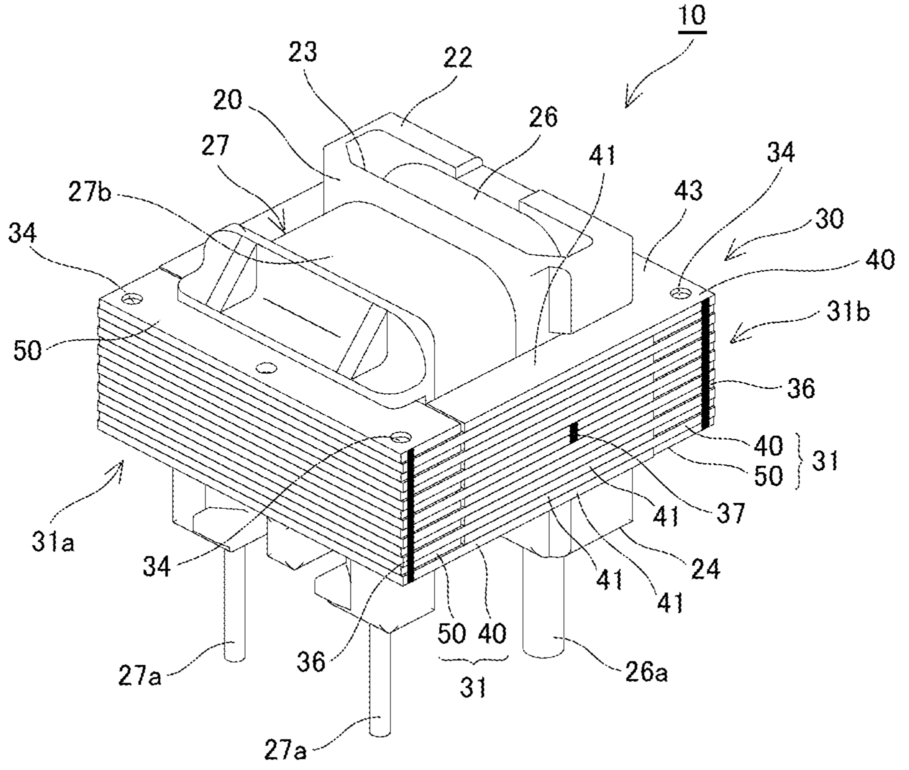
FIG. 1 is a perspective view of a current transformer of one embodiment of the present invention.

FIG. 1 is a perspective view of current transformer 10 in accordance with one embodiment of the present invention. As shown in the figure, the current transformer 10 comprises a resin-made bobbin 20 having a primary coil 26 and a wire-wound secondary coil 27, and a core 30 forming a common magnetic path for the primary coil 26 and the secondary coil 27. In the embodiment shown in the figure, the primary coil 26 is a U-shaped wire-wound member, and the secondary coil 27 is a thin wire member wound on a bobbin 20 and protected by a tape around the periphery.

Figure 2:
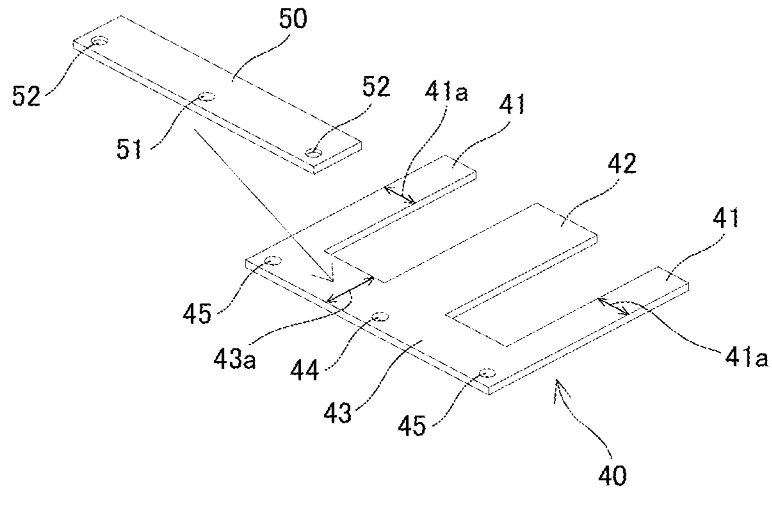
FIG. 2 is an exploded perspective view of a core component for the current transformer.

The core 30 is composed of a plurality of core components 31 that were stacked together. FIG. 2 is an exploded perspective view of one core component 31 that makes up the core 30. The core component 31 may comprise E-type core 40 and an I-type core 50, as shown in the figure. S-type core 40 and I-type core 50 can be prepared by press-punching an electromagnetic steel sheet such as a silicon steel sheet. For example, the electromagnetic steel sheet may be in the form of a thin strip.

E-type core 40 comprises three rectangular-shaped legs 41, 42, 41 extending substantially parallel to each other, and a rectangular-shaped connecting part 43 connected at proximal ends the legs 41, 42, 41. The width dimension 43*a* of the connecting part 43 is preferably longer than the width dimension 41*a* of the leg 41 to suppress magnetic flux leakage. The I-type core 50 may be a rectangular shape with the same size as the connecting part 43. E-type core 40 and I-type core 50 preferably have pilot holes 44, 51 for positioning them. Furthermore, the longitudinal dimension of I-type core 50 is preferred to be 0.1 mm to 0.3 mm smaller than the longitudinal dimension of the connecting part 43 of E-type core 40 to make positioning and stacking of I-type 50 on E-type core 40 easier.

I-type core 50 is placed on and bonded to the connecting part 43 of E-type core 40 to form a single-piece core component 31. E-type core and I-type core are bonded, for example, by crimping 34 shown in FIGS. 3 and 4, welding 35 shown in FIG. 5, or applying glue (not shown).

Figure 3:
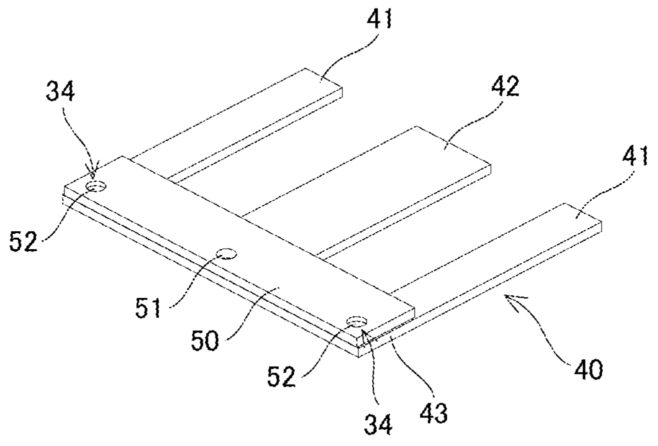
FIG. 3 shows a single-piece core component formed from E-type core and I-type core bonded by crimping, wherein (a) is a perspective view and (b) is a cross-sectional view.
Figure 3:
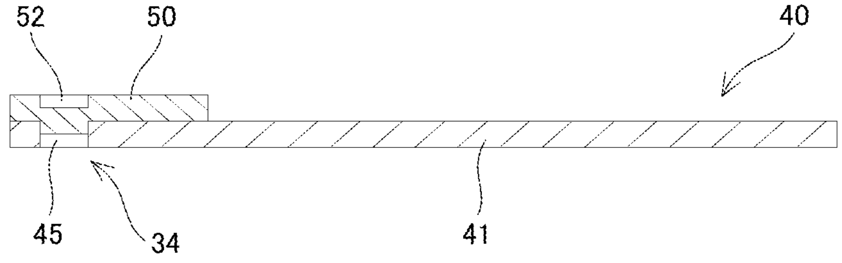
Figure 4:
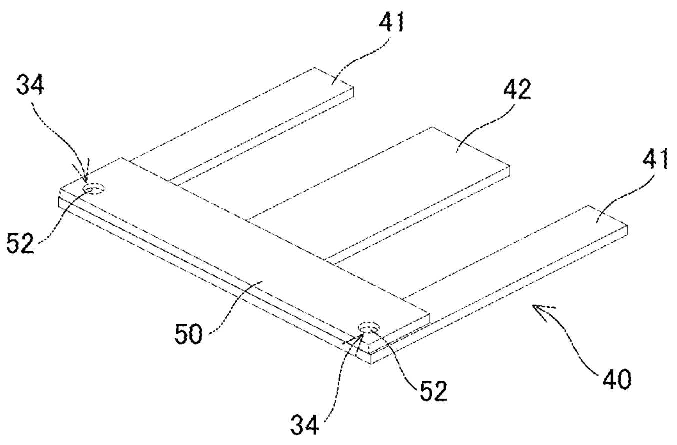
FIG. 4 is a perspective view of one embodiment without a pilot hole and shows a single-piece core component of E-type core and I-type core bonded by crimping.

In one embodiment, crimping 34 is used to combine E-type core 40 and I-type core 50 into a single-piece core component. In this case, crimp holes 45 are formed in one of E-type core 40 or I-type core 50, and dowels 52 are provided on the other of E-type core 40 or I-type core 50, as shown in FIG. 2. Then, as shown in FIGS. 3 (*a*) and 3 (*b*), E-type core 40 and I-type core 50 are stacked while aligning the crimp holes 45 and dowels 52, and subject to the crimping process. The crimp hole 45 can be formed at the same time when E-type core 40 or I-type core 50 is prepared by press-punching. The crimp holes 45 are preferably formed in E-type core 40 having a larger area to suppress reduction of strength and deformation of the core 30.

Figure 5:
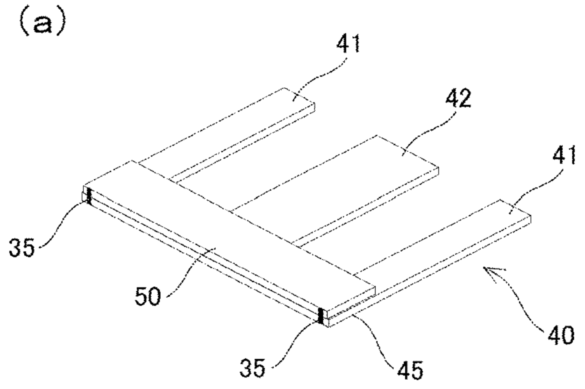
FIG. 5 is a perspective view of a core component bonded by welding E-type core and I-type core, wherein (a) is an embodiment of weld applied to the end edge and (b) is an embodiment of weld applied to the side face.
Figure 5:
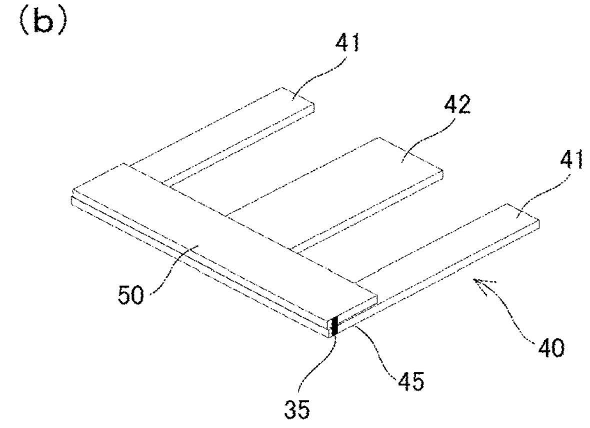

In another embodiment, welding 35 is used to combine E-type core 40 and I-type core 50 into a single-piece core component. In this case, welding is performed between the outer edge of the connecting part 43 of E-type core 40 and the outer edge of I-type core, as shown in FIG. 5 (*a*). Welding 35 may be applied at opposed ends of the connecting part 43 of E-type core 40 and I-type core 50, as shown in FIG. 5 (*b*). Examples of welding 35 include laser welding and resistance welding (the same is applied to welding in the description below) but are not limited to them.

Figure 6:
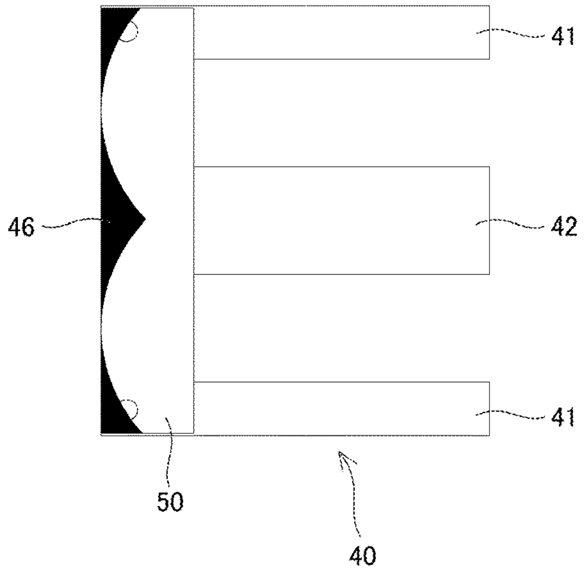
FIG. 6 is a plan view showing the region of low magnetic flux density in the core components mounted on the current transformer.

When E-type core 40 and I-type core 50 are interconnected by weld 35, the magnetic properties of the welded area and its vicinity may deteriorate. For this reason, as shown in FIG. 6, welding 35 is performed preferably on the region 46 of low magnetic flux density in the core components 31, i.e., on the corners and the central area near the outer edge of E-type core 40 and I-type core 50. Because the area 46 has a low magnetic flux density in the magnetic path, the influence on performance is suppressed even if the magnetic property becomes lower to a certain extent.

As shown in FIGS. 3 and 5, a plurality of core components 31 consisting of a single-piece core components of E-type core 40 and I-type core 50 are prepared (core component preparing step). The core components 31 are mounted on the bobbin 20. For example, the bobbin 20 has a U-shaped primary coil 26 and a wire-wound secondary coil 27 protected by the tape around the periphery, as shown in FIG. 7, and a through hollow section 21 in the direction perpendicular to the coils 26, 27 (bobbin preparing step).

Figure 7:
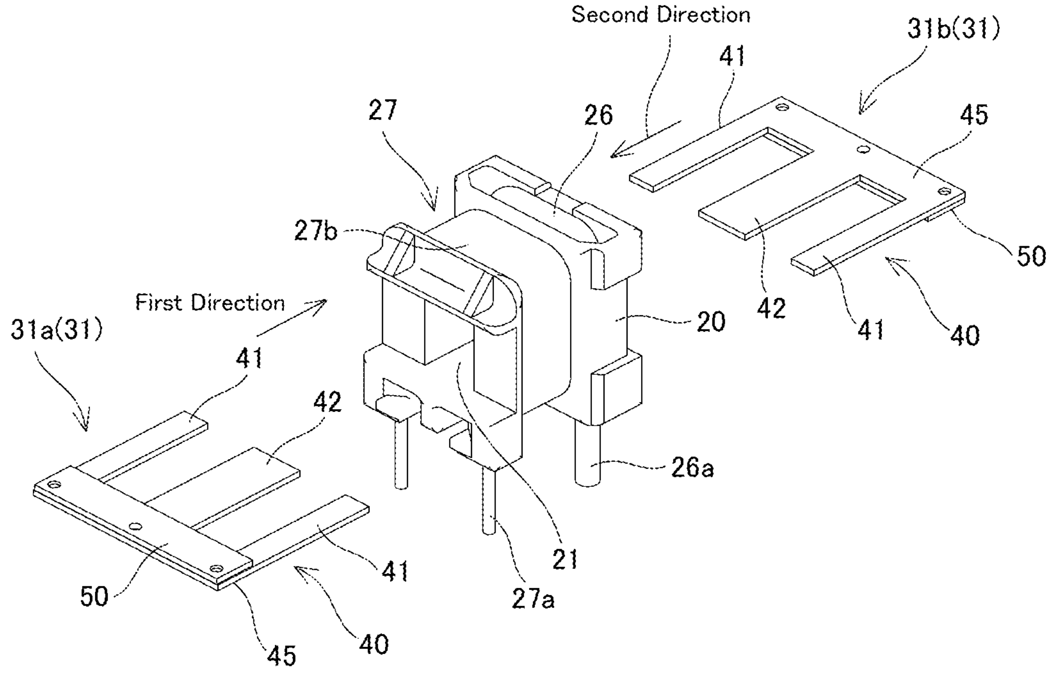
FIG. 7 is a side elevational view showing the process of inserting the core component into the bobbin having a primary coil and a wire-wound secondary coil.
Figure 8:
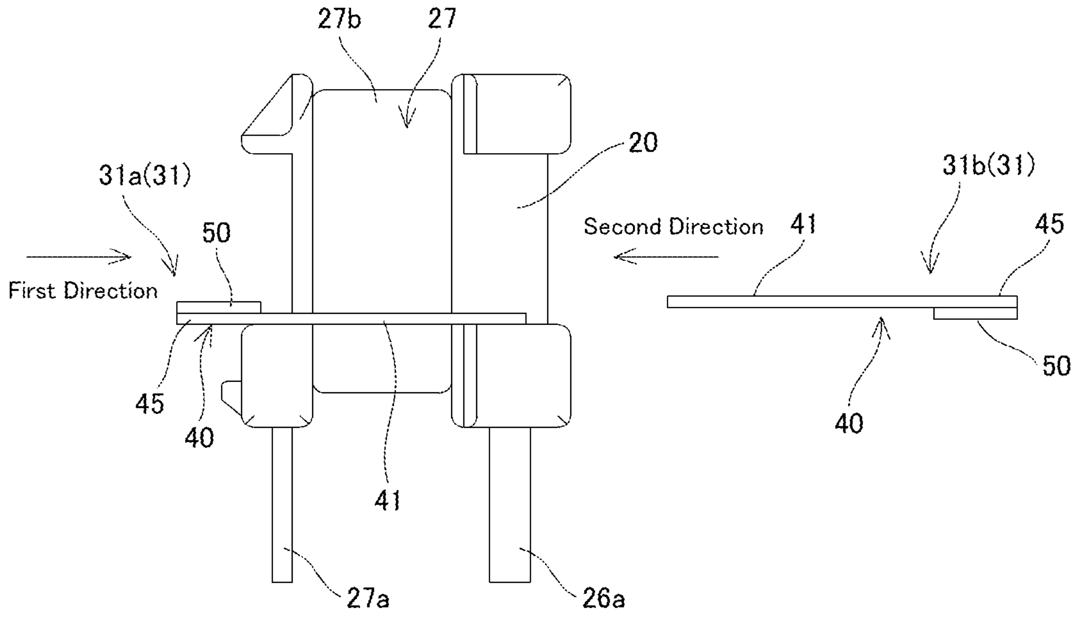
FIG. 8 is a longitudinal sectional view showing the process of inserting the core component into the bobbin having a primary coil and a wire-wound secondary coil.

As shown in FIGS. 7 and 8, the core component 31 is stacked by sequentially inserting the central leg 42 into the hollow section 21 of the bobbin 20. Specifically, as shown in the figure, the core components 31 and 31 are inserted into the hollow section 21, alternately and interchanging the top and bottom of the core component. For example, in FIGS. 7 and 8, the direction from left to right on the paper is referred to as a first direction, and the direction from right to left and opposite the first direction is referred to as a second direction. The first core component 31*a* having I type core 50 on top of the E-type core 40 is arranged to approach the bobbin 20 from the first direction, and then the central leg 42 is inserted into the hollow section 21 with legs 41, 42, 41 facing toward the bobbin 20. The second core component 31*b* having I type core 50 under the E-type core 40 is arranged to approach the bobbin 20, and then the central leg 42 is inserted into the hollow section 21 from the second direction with legs 41, 42, 41 facing toward the bobbin 20. Thus, the legs 41, 42, 41 of the second component 31*b* is placed on the legs 41, 42, 41 of the first component 31*a*. In the following, the core component that is inserted from the first direction is referred to as the first core component 31*a*, and the core component that is inserted from the second direction is referred to as the second core component 31*b*. Subsequently, the first core component 31*a* is inserted from the first direction, and the second core component 31*b* is inserted from the second direction, whereby the first core components 31*a* and the second core components 31*b* are stacked in the state where legs 41, 42, 41 (42 is not shown) are superimposed (stacking step).

Figure 9:
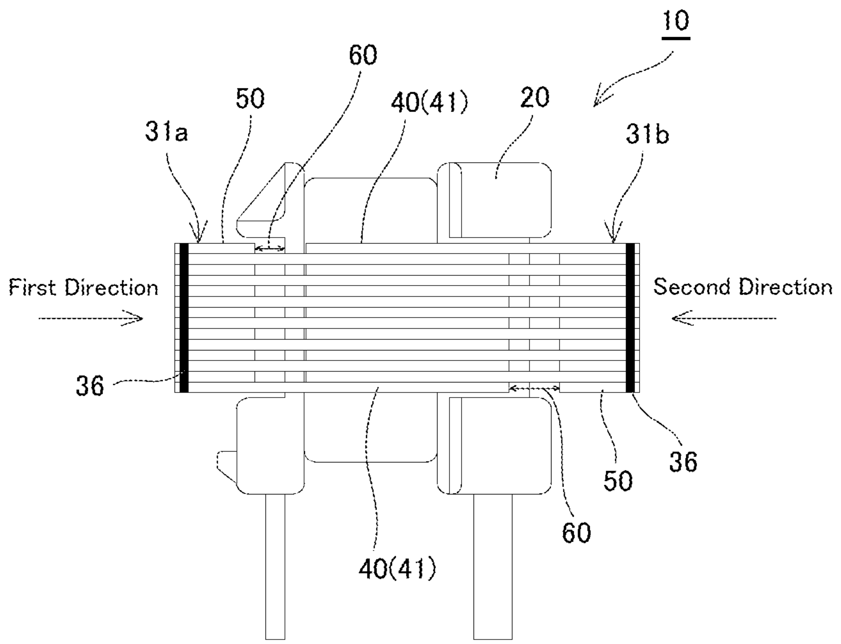
FIG. 9 is a side elevational view showing the status wherein a group of core components inserted into the bobbin from a first direction are joined by welding, and a group of core components inserted into the bobbin from a second direction are joined by welding.

In this state, however, the first core components 31*a* and the second core components 31*b* have not been fixed yet and remain inserted in the hollow section 21. Therefore, as shown in FIG. 9, a stack of the first core components 31*a* is aligned at the respective edges and then combined in a single core component block, and a stack of the second core components 31*b* is aligned at the respective edges and then combined in a single core component block, to prevent them from falling apart (block forming step). A single core component block can be made by a weld, for example, as shown by reference number 36 in FIG. 9. Examples of welding include laser welding or resistance welding. In addition, crimping or bonding may use to form the single-piece core component. A weld 36, if applied, is desirable to perform at the area of low magnetic flux density 46, as described above with reference to FIG. 6.

In the current transformer 10 including a block of the first core components 31*a* and a block of the second core components 31*b*, a gap 60 is formed between distal ends of legs 41, 42, 41 of the first core component 31*a* and an inner-side end edge of I-type core 50 of the second core component 31*b*. A gap 60 is also formed between distal ends of legs 41, 42, 41 of the second core component 31*b* and an inner-side end edge of I-type core 50 of the first core component 31*a*. A spacing of the gap 60 can be adjusted by pushing the first core component 31*a* from the first direction and the second core component 31*b* from the second direction (gap adjusting step).

Figure 10:
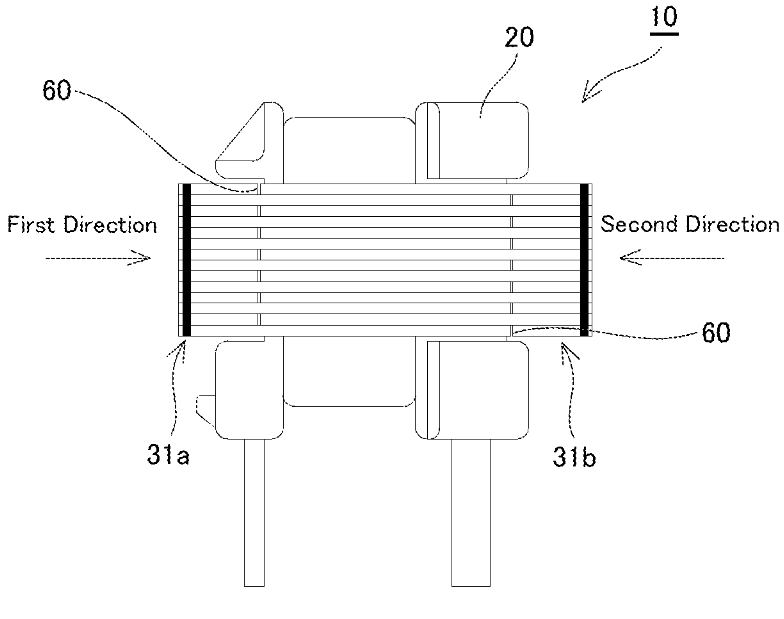
FIG. 10 is a side elevational view showing the process of adjusting a spacing of gap formed between the core component inserted from the first direction and combined into a single core component and the core component inserted from the second direction and combined into a single core component.

Adjusting the gap 60 can be performed, as shown by the arrows in FIGS. 9 and 10, by pushing the first core component 31*a* from the first direction and the second core component 31*b* from the second direction while referring to the output voltage characteristics of current transformer 10. Therefore, the output voltage of the current transformer 10 can be adjusted with high precision, and the tolerances can be made as small as possible by adjusting the spacing of the gap 60, even when there occurred a variation in the magnetic characteristics of the core material or in the temperature during the annealing process for the heat treatment of the core. In accordance with the present invention, the tolerance can be up to ±1% in terms of the actual measured value, preferably up to ±0.5%. For example, the spacing of the gap 60 can be 0.1-0.4 mm, preferably about 0.2 mm.

After the adjustment of gap 60 is completed, the first core component 31*a* and the second core component 31*b* are joined by weld 37 or other means at the overlapped legs 41, 41 on the outside position (joining step). Since the first and second core components 31*a* and 31*b* are joined, the gap 60, once adjusted, can be prevented from changing the determined distance. Each of the first and second core components 31*a* and 31*b* is combined into a single core component block before this joining step. Therefore, welding 37 for joining the first and second core components 31*a* and 31*b* may be a spot welding only at one or more places. Therefore, the magnetic properties of the core components 31*a* and 31*b* are not substantially affected by welding 37.

In the current transformer 10 of the present invention, the first core component 31*a* and the second core component 31*b* can be made into single core component blocks without using varnish, glue, or resin. Therefore, the current transformers are not affected by thermal expansion and contraction and provide excellent temperature characteristics.

Figure 12:
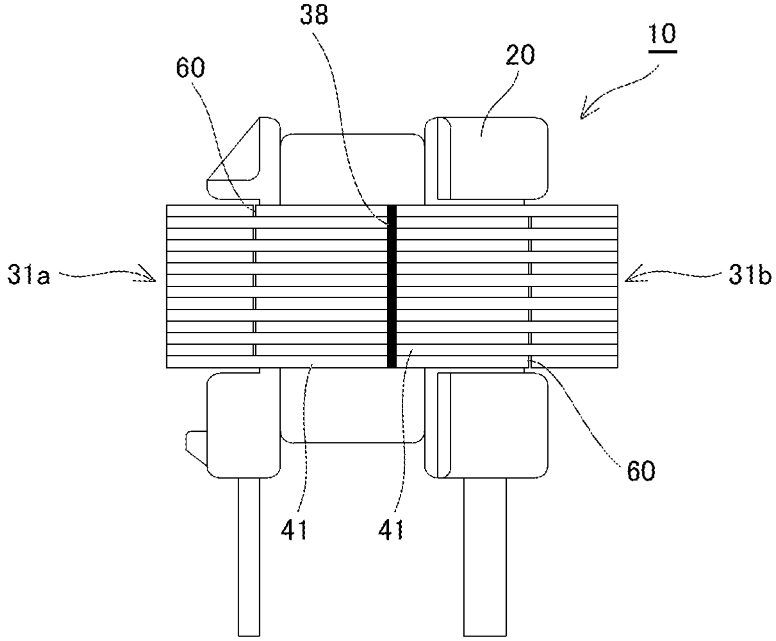
FIG. 12 is a side elevational view showing one embodiment wherein after adjusting the spacing of gap, the core component inserted from the first direction and the core component inserted from the second direction are joined to each other to form a single core component block.

In the above explanation, after a stack of the first core component 31*a* and a stack of the second core component 31*b* are formed, the spacing of gap 60 is adjusted, and then the stacks of the first and second core components 31*a* and 31*b* are joined to each other. However, for example, a spacing of the gap 60 may be adjusted without applying weld 36 to the stacks of the first and second core components 31*a* and 31*b*, as shown in FIG. 9. In this case, after adjusting the gap 60, the legs 41, 41 located on the outside the first and second core components 31*a* and 31*b* can be joined at the overlapped positions thereof with line welding 38, as shown in FIG. 12. This simplifies the manufacturing process of the current transformer 10.

Figure 11:
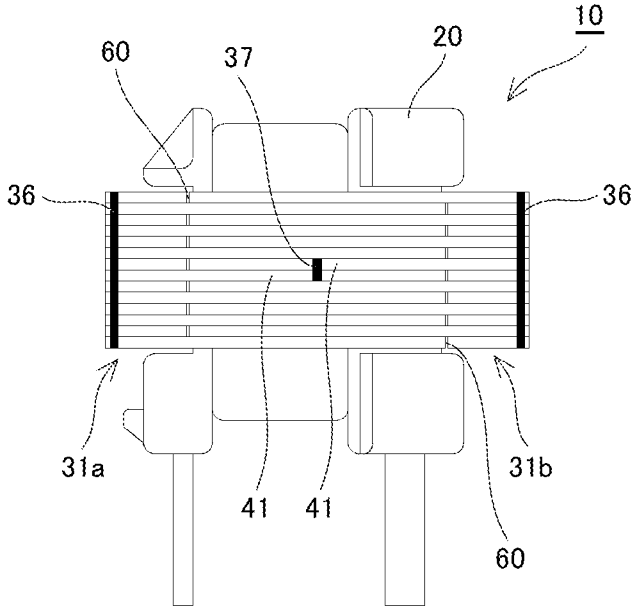
FIG. 11 is a side elevational view showing the status wherein after adjusting the spacing of gap, the core component inserted from the first direction and combined into a single core component and the core component inserted from the second direction and combined into a single core component are joined to each other by spot welding to form a single core component block.

In accordance with the present invention, the first core components 31*a* and the second core component 31*b* are welded 37, 38 at substantial central part of the legs 41 of E-type core 40, as shown in FIGS. 11 and 12. Therefore, the length of linear expansion is suppressed to half. In addition, the first core components 31*a* and the second core components 31*b* expand linearly in the same direction starting from the welds 37, 38. As a result, the gap 60 remains almost unchanged. Welds 36 and 37 in FIG. 11 and weld 38 in FIG. 12 are formed substantially parallel with the stacking direction of the first and second core components 31*a* and 31*b*. So, the linear thermal expansion of these welds does not affect the dimension of the gap 60.

Figure 13:
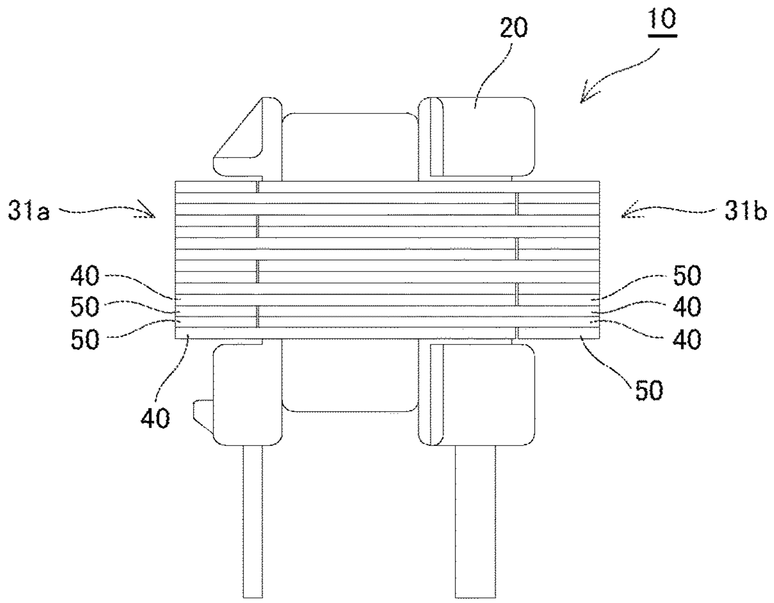
FIG. 13 is a side elevational view showing one embodiment wherein the order of placing the top surface and the bottom surface is changed when the core components are stacked.

In the embodiment mentioned above, all the first core components 31*a* are stacked with I-type core 50 facing up, and all the second core components 31*b* are stacked with I-type core 50 facing down. However, if the first core component 31*a* and the second core component 31*b* are paired, as shown in FIG. 13, their top surface and bottom surface can be changed alternately, or every multiple pairs, or even randomly. This makes it possible to equalize the thickness variation caused by burrs 73 and slope shaped, sheared surfaces 70 (shown in FIG. 14) when E-type core 40 and I-type core 50 are prepared by press-punching works.

Figure 14:
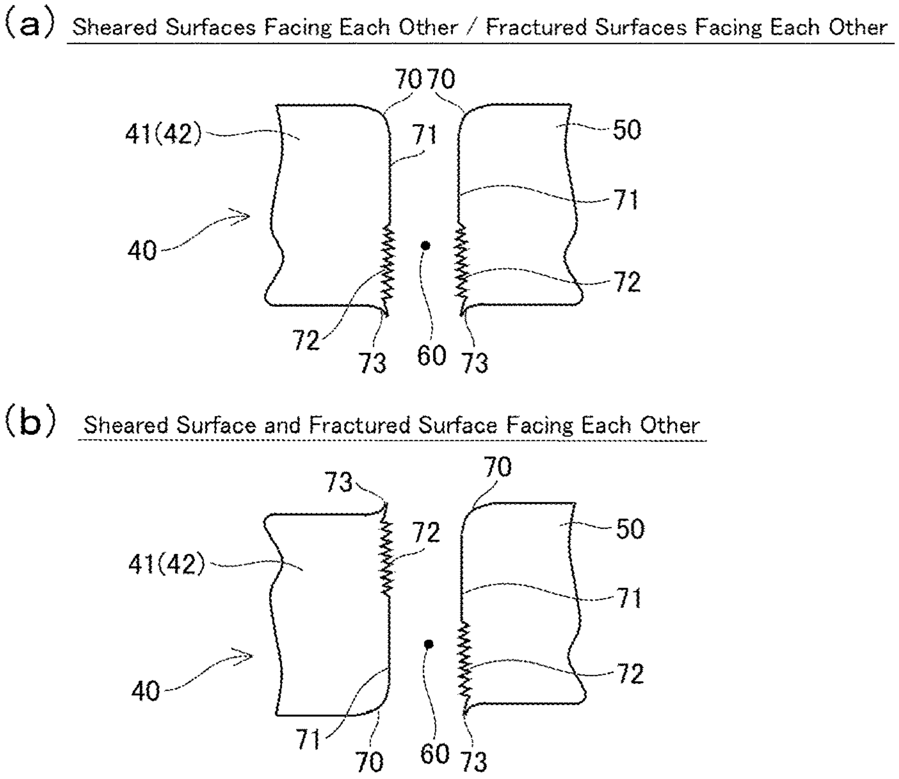
FIG. 14 is an enlarged view showing the butt portion between the E-type core and the I-type core (both made by press-punching process) opposing to each other across the gap wherein (a) is an embodiment of the sheared surfaces facing each other and the fractured surfaces facing each other, and (b) is an embodiment of the sheared surface and the fractured surface facing each other.
Figure 15:
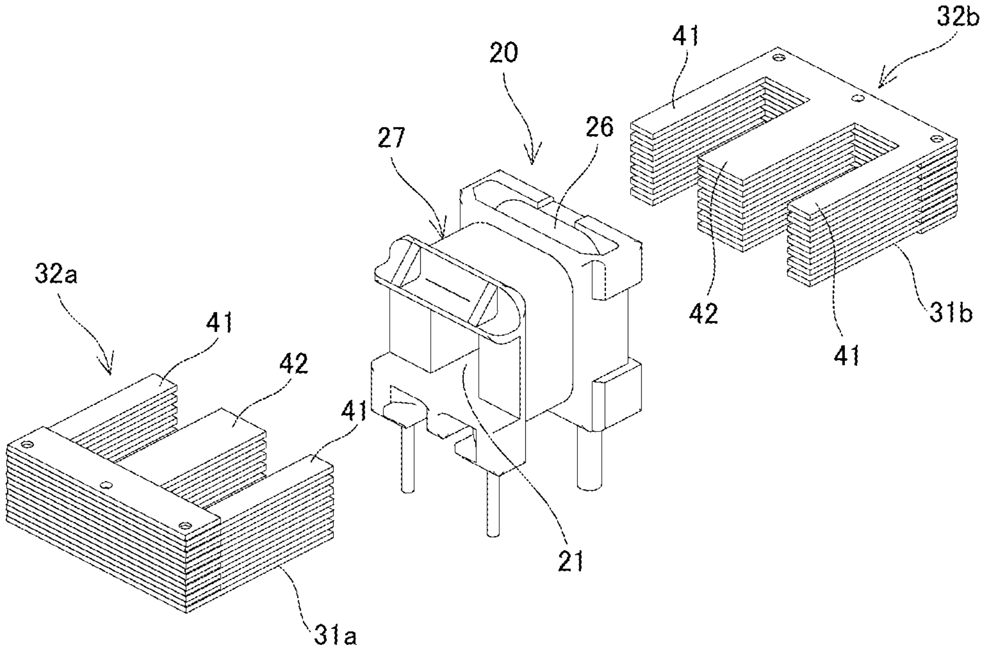
FIG. 15 is a perspective view showing one embodiment of manufacturing the current transformer wherein a single core component block is inserted into the bobbin from the first direction, and a single core component block is inserted into the bobbin from the second direction.

FIGS. 14 (*a*) and 14 (*b*) are enlarged views showing the butt portion between the distal ends of legs 41, 42, 41 of E-type core 40 of the first core component 31*a* and the inner end face of I-type core 50 of the second core component 31*b*. When E-type core 40 and I-type core 50 are made by the press-punching process, end faces of E-type core 40 and I-type core 50 have rounded, slope shaped, sheared surfaces 70 on the corners, sheared surface 71 with striations formed in the thickness direction, fractured surface 72 with unevenness as if the material was plucked, or jagged burrs 73 protruding from the end face in the punching direction, as shown in FIG. 14. When E-type core 40 and I-type core 50 are placed such that the sheared surface 71 and the sheared surface 71 face each other, and the fractured surface 72 and the fractured surface 72 face each other, as shown in FIG. 14 (*a*), the fractured surfaces 72, 72 come into contact but a gap remains between the sheared surfaces 71, 71, resulting in that the adjustable range of the spacing of the gap becomes smaller, and the adjustable range of the output voltage also becomes narrower. Therefore, it is preferable to arrange E-type core 40 and I-type core 50 such that the sheared surface 71 and the fractured surface 72 are opposed to each other, as shown in FIG. 14 (*b*). This allows the gap 60 to be smaller, thus increasing the adjustable range of the gap 60 and the output voltage and making it easier to adjust them.

Other Embodiments

In the above embodiment, the first core component 31*a* and the second core component 31*b* are inserted into the hollow section 21 one by one. However, in another embodiment as shown in FIG. 5, the first core components 31*a* are stacked and then integrated into a block by welding or crimping to form a first core component block 32*a*, and the second core components 31*b* are stacked and then integrated into a block by welding or crimping to form a second core component block 32*b*. When the first and second core component blocks 32*a*, 32*b* are mounted on a bobbin 20, leg 41 of the second core component 31*b* is disposed in between legs 41, 41 of the first core components 31*a*, 31*a*, and leg 41 of the first core component 31*a* is disposed in between legs 41, 41 of the second core components 31*b*, 31*b*. With this embodiment, it is not necessary to stack core components 31*a*, 31*b* one by one in the bobbin 20, making the manufacturing process simple to the greatest extent.

Figure 16:
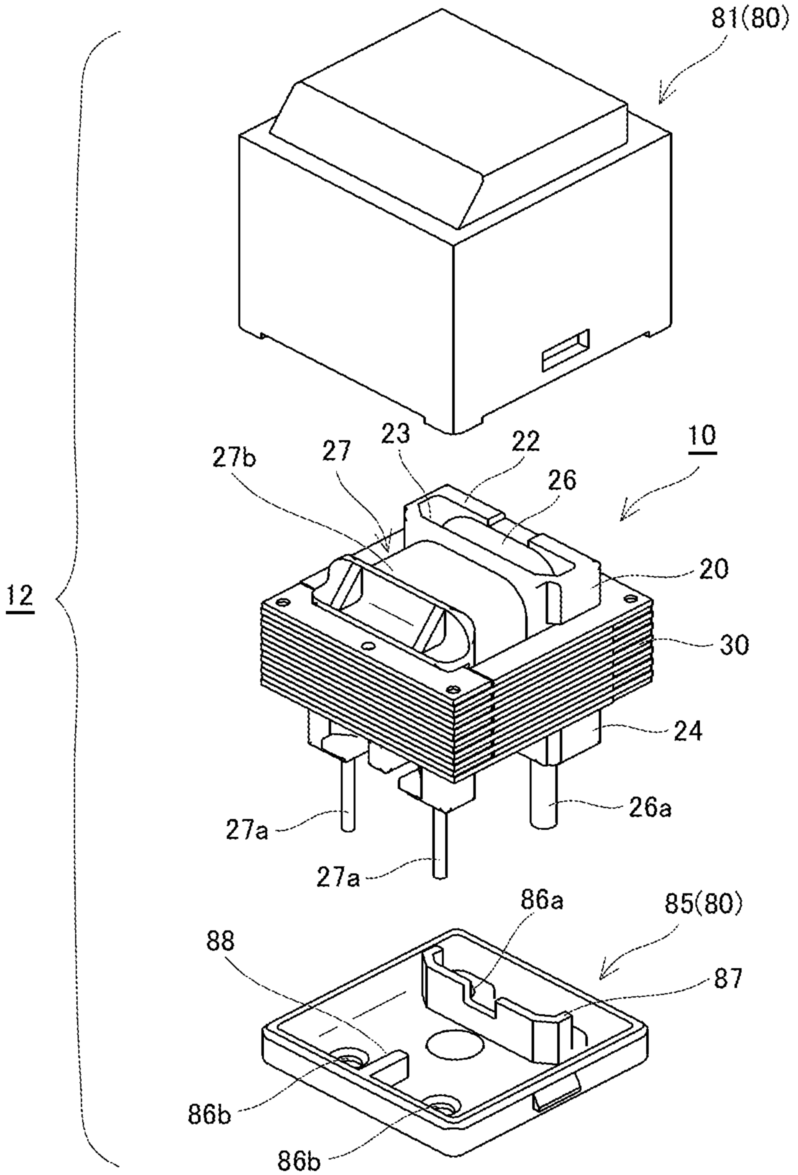
FIG. 16 is an exploded view of the current transformer module in accordance with the present invention.
Figure 17:
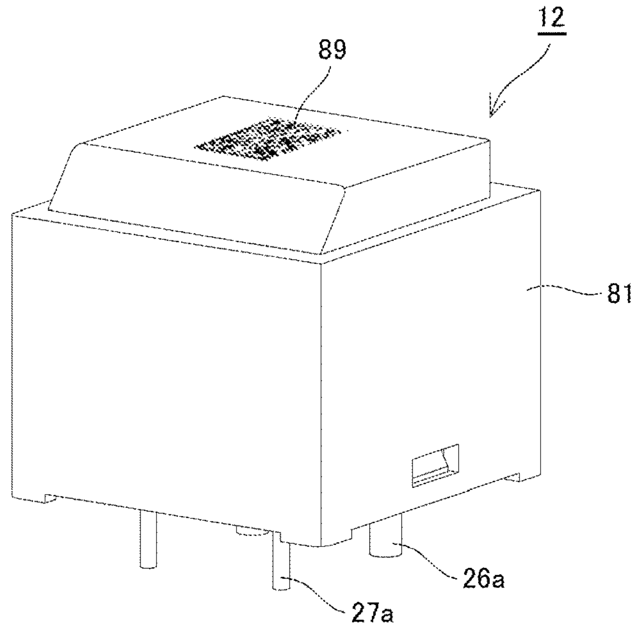
FIG. 17 is a perspective view showing the current transformer module.
Figure 18:
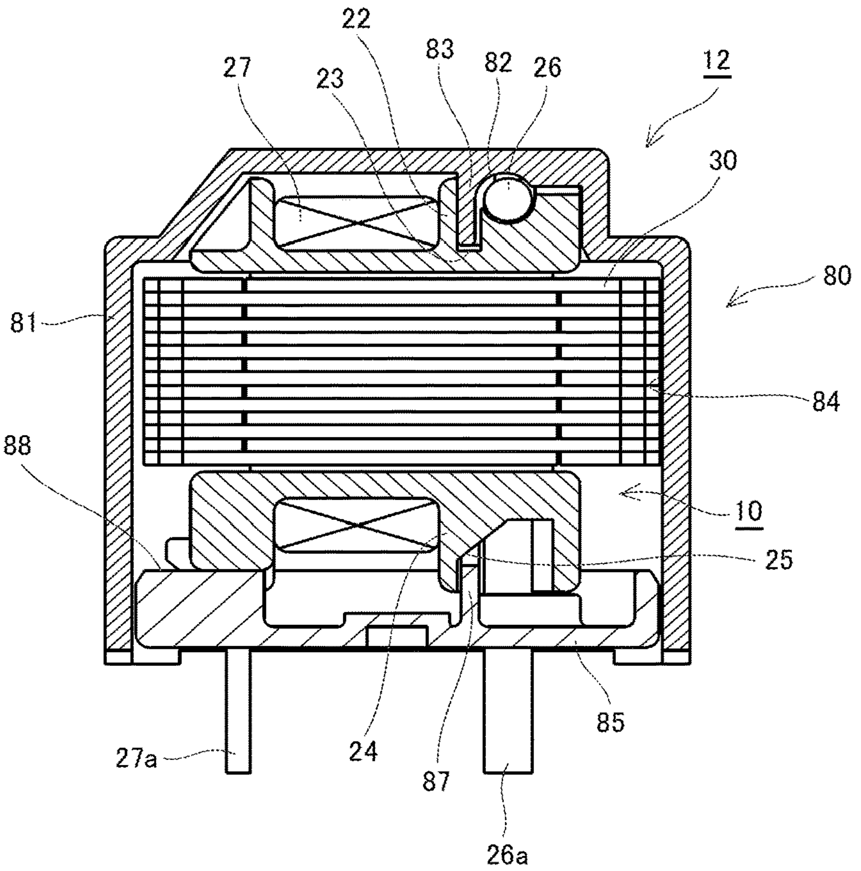
FIG. 18 is a cross-sectional view of the current transformer module.
Figure 19:
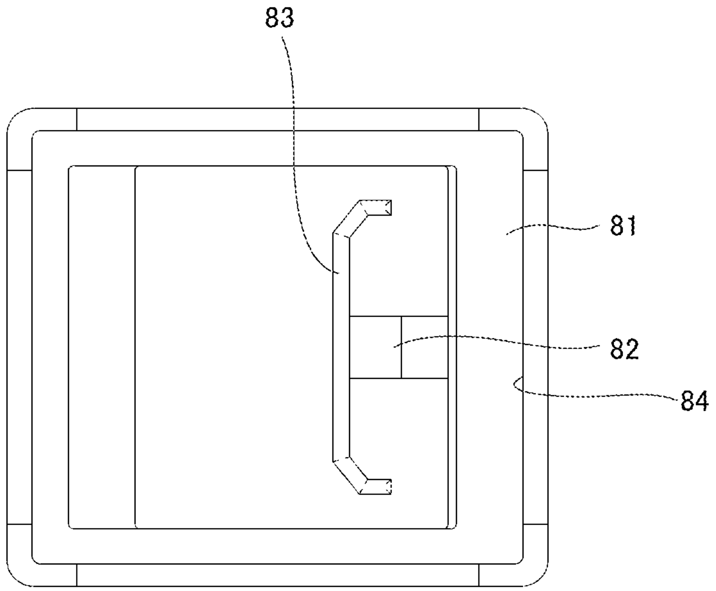
FIG. 19 is a bottom view of an upper case.
Figure 20:
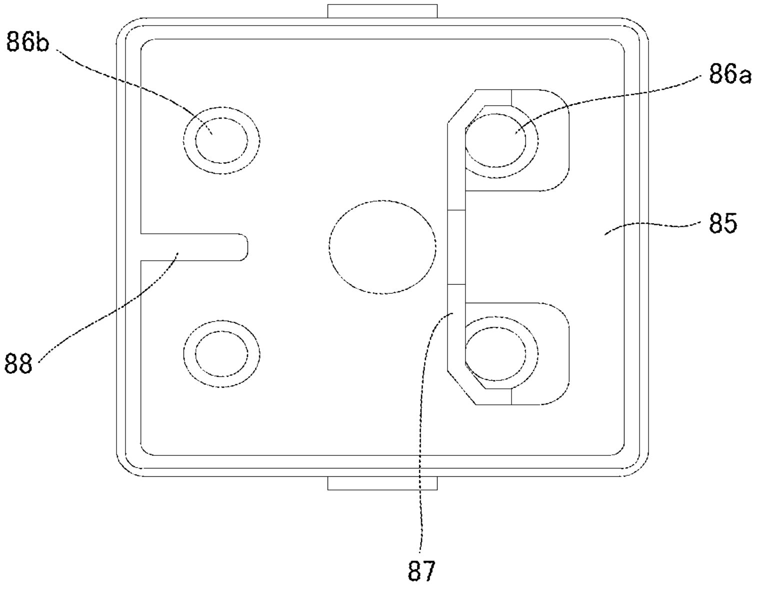
FIG. 20 is a plan view of a lower case.

The current transformer 10 obtained by the above can be accommodated in a casing 80, for example, and used as a current transformer module 12. FIG. 16 is an exploded perspective view of the current transformer 10 and the casing 80 for housing it. FIG. 17 is a perspective view of the current transformer 10, and FIG. 18 is a longitudinal cross-sectional view of the current transformer 10. As shown in the figures, the casing 80 comprises an upper case 81 and a lower case 85. The upper case 81 is a box-like shape with an opening on its underside and is configured to house the core 30 and bobbin 20. The lower case 85 may be a plate-like shape configured to place the bobbin 20 thereon and to close the lower surface of the upper case 81. FIG. 19 shows a bottom view of the upper case 81, and FIG. 20 shows a plan view of the lower case 85.

The lower case 85 has insertion holes 86*a*, 86*b*, through which the terminal wires 26*a*, 26*a* of the primary coil 26 and the terminal wires 27*a*, 27*a* of the secondary coil 27 extend out, respectively. As shown in FIGS. 16 and 18, the current transformer module 12 is produced by inserting the respective terminal wires 26*a*, 26*b* into the insertion holes 86*a*, 86*b* and fitting the upper case 81 with the bobbin 20 positioned in the lower case 85. The obtained current transformer module 12 is shown in FIG. 17.

After the current transformer module 12 is made, the output voltage characteristics are individually measured, and the obtained characteristic data can be printed or sealed on the upper case as a data matrix 89, as shown in FIG. 17. When the current transformer module 12 is introduced into AC equipment, the characteristics data read by the data matrix 89 can be adjusted on the control. This contributes to achieving more accurate output voltage characteristics.

As for a combination of the current transformer 10 and the casing 80 mentioned above, there is a demand for downsizing the current transformer module 12. To downsize the current transformer module 12, the current transformer 10 must be smaller. As shown in FIGS. 16 and 18, the protruding heights of the upper and lower insulating walls 22 and 24, which insulate the area between the primary and secondary coils 26 and 27 on the bobbin 20, need to be lowered.

On the other hand, the creepage distance (shortest distance measured along the surface of the insulation) must be kept for insulating the primary coil 26 from the secondary coil 27.

In accordance with the present invention, as shown in FIGS. 16 and 18, the bobbin 20 is provided with an upper insulation wall 22 between the primary coil 26 and the secondary coil 27, and is also formed with an upper side recess 23 between the upper insulation wall 22 and the primary coil 26. On the other hand, the upper case 81 has an upper side protrusion 83 adapted to fit into the upper side recess 23, as shown in FIGS. 18 and 19.

When the current transformer 10 is housed in the upper case 81, the upper side protrusion 83 of the upper case 81 fits into the upper side recess 23 of the bobbin 20. This makes up an insulating wall and provides a longer creepage distance of insulation between the primary coil 26 and the secondary coil 27. Since the upper side protrusion 83 fits into the upper side recess 23, the bobbin 20 can be adequately positioned in the upper case 81.

The upper case 81 is formed on the inner side of the upper surface with a recess along the outer shape of the primary coil 26 as a contact area 82 that restrains the primary coil 26 from coming loose. This contact area 82 prevents the primary side coil 26 from being lifted when the current transformer module 12 is mounted on a printed circuit board or the like.

As shown in FIG. 18, the bobbin 20 is provided with a lower insulation wall 24 between the primary coil 26 and the secondary coil 27, and is also formed with a lower side recess 25 between the lower insulation wall 24 and the primary coil 26. On the other hand, the lower case 85 has a lower side protrusion 87 adapted to fit into the lower side recess 25, as shown in FIGS. 16, 18 and 19.

When the current transformer 10 is placed on the lower case 85, the lower side protrusion 87 fits into the lower side recess 25 of the bobbin 20. This makes up an insulating wall and provides a longer creepage distance of insulation between the primary coil 26 and the secondary coil 27.

Thus, the current transformer 10 and the current transformer module 12 can be downsized by lowering the heights of the upper and lower insulating walls 22 and 24 of the bobbin 20 while keeping the creepage distance between the primary coil 26 and the secondary coil 27. In addition, since the lower side protrusion 87 fits into the lower side recess 25, the bobbin 20 can be adequately positioned in the lower case 85.

The lower case 85 is preferably provided with a step portion 88 to support the lower surface of the bobbin 20. When the bottom surface of the bobbin 20 contacts the step portion 88 of the lower case 85, the bobbin 20 can be held in the casing 80 without tilting.

Concerning the current transformer 10 of the present invention, the gap 60 can be adjusted while referring to the output voltage characteristics. Hence, the core 30 has some play against the bobbin 20 in the longitudinal direction of the legs 41, depending on the width of the gap 60. This may cause the core 30 to slide in the passage direction of the hollow section 21, resulting in the rattling in the current transformer module 12. Therefore, the current transformer module 12 is preferably required to determine the position of core 30 relative to the bobbin 20 to avoid this rattling.

As described above, the position of bobbin 20 in the casing 80 is determined by the engagement between the upper side recess 23 and the upper side protrusion 83 and between the lower side recess 25 and the lower side protrusion 87. In this case, if the position of the core 30 can be determined relative to the casing 80, the positions of the core 30 and the bobbin 20 can also be determined relative to the casing 80. In accordance with this embodiment, the structure to determine the position of the core 30 relative to the casing 80 is employed, as shown in FIG. 18. Specifically, one of the inner surfaces 84 of the upper case 81 is brought into contact with the core 30, in the state where the upper case 81 is positioned relative to the bobbin 20, such that the connecting part 43 of E-type core 40 and I-type core 50 can be sandwiched by the bobbin 20 and the inner surface 84 of the upper case 81. Thus, the core 30 is pressed against the bobbin 20 so that the positions of the core 30 and the bobbin 20 are determined, preventing the occurrence of rattling.

The above description is intended to explain the invention and should not be construed as limiting or reducing the scope of the invention as described in the claims. The present invention is not limited to the above examples, and of course various variations are possible within the technical scope of the claims.

EXAMPLES

Figure 21:
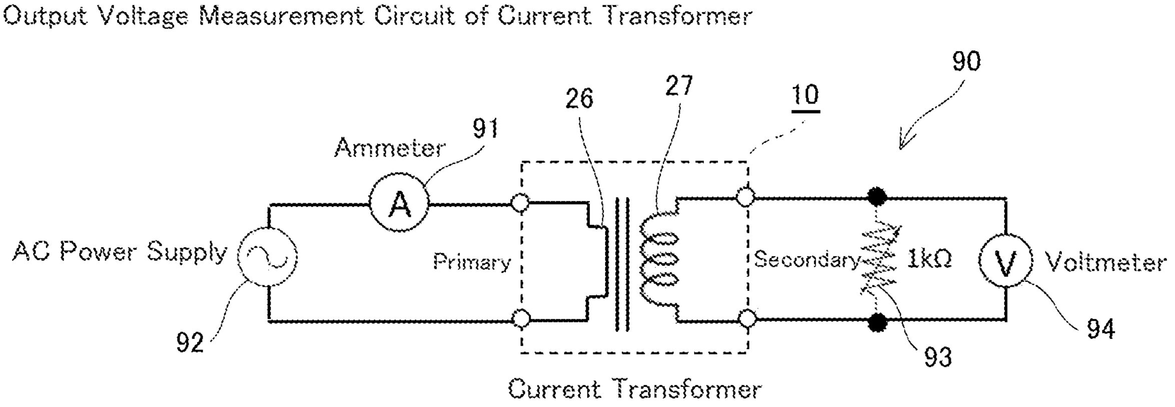
FIG. 21 is a circuit diagram of an output voltage measurement circuit of the current transformer in the examples.

The output voltage characteristics were measured by incorporating the current transformer 10 into the output voltage measurement circuit 90 shown in FIG. 21. In the output voltage measurement circuit 90, the primary coil 26 of the current transformer 10 is connected to an AC power supply 92 in series with an ammeter 91, and the secondary coil 27 of the current transformer 10 is connected to a voltmeter 94 in parallel with a resistor 93. The current transformer 10 shown in FIG. 1 was employed as Inventive Example of the present invention.

Figure 22:
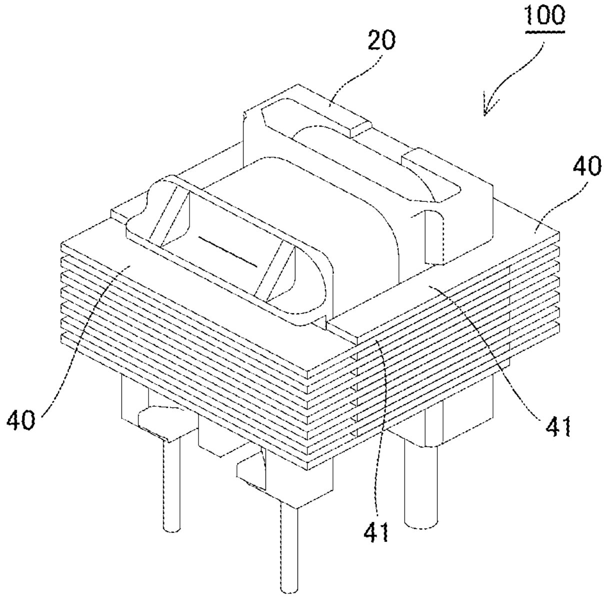
FIG. 22 is a perspective view of the current transformer of Comparative Example 1.
Figure 23:
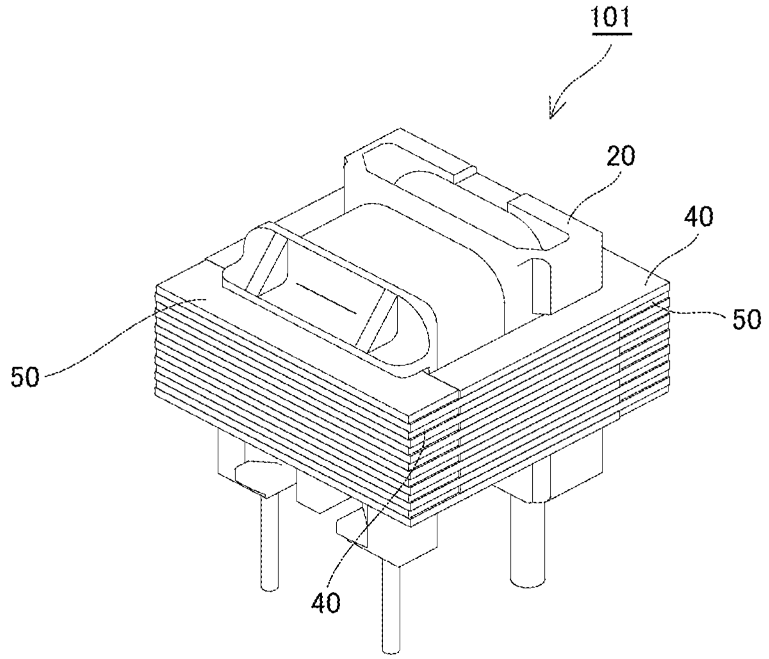
FIG. 23 is a perspective view of the current transformer of Comparative Example 2.
Figure 24:
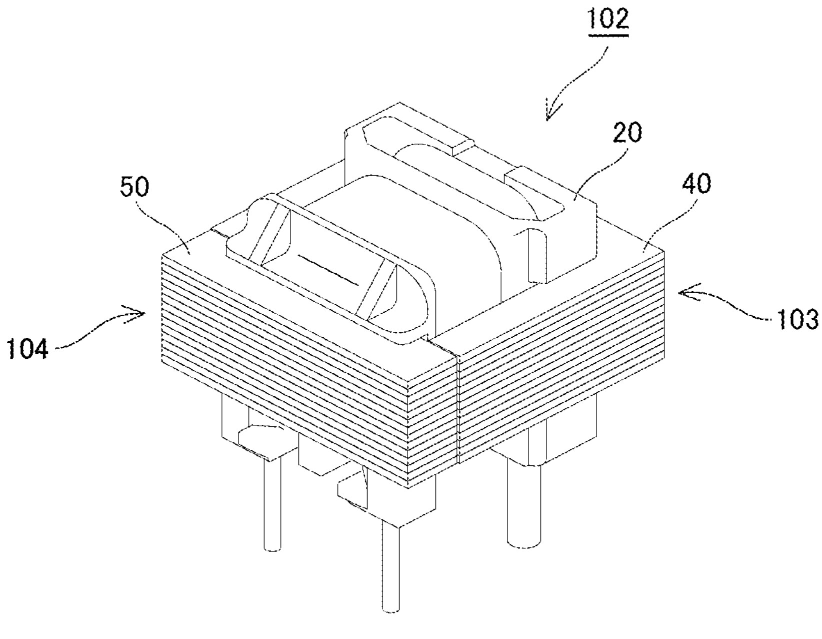
FIG. 24 is a perspective view of the current transformer of Comparative Example 3.

For comparison, Comparative Examples 1-3 were prepared. Comparative Example 1 is a current transformer 100 with E-type core 40 and without I-type core that is shown in FIG. 1 of Patent Document 1 (FIG. 22). Comparative example 2 is a current transformer 101 with E-type core 40 and I-type core 50 shown in FIG. 6 of Patent Document 1 wherein the E-type and I-type cores are integrated with varnish, etc. (FIG. 23). Comparative Example 3 is a current transformer 102 wherein E-type cores 40 are stacked vertically to form a block 103 and I-type cores 50 are also stacked vertically to form a block 104, and then the blocks 103, 104 are butted up each other and bonded with varnish (FIG. 24).

Example 1

Figure 25:
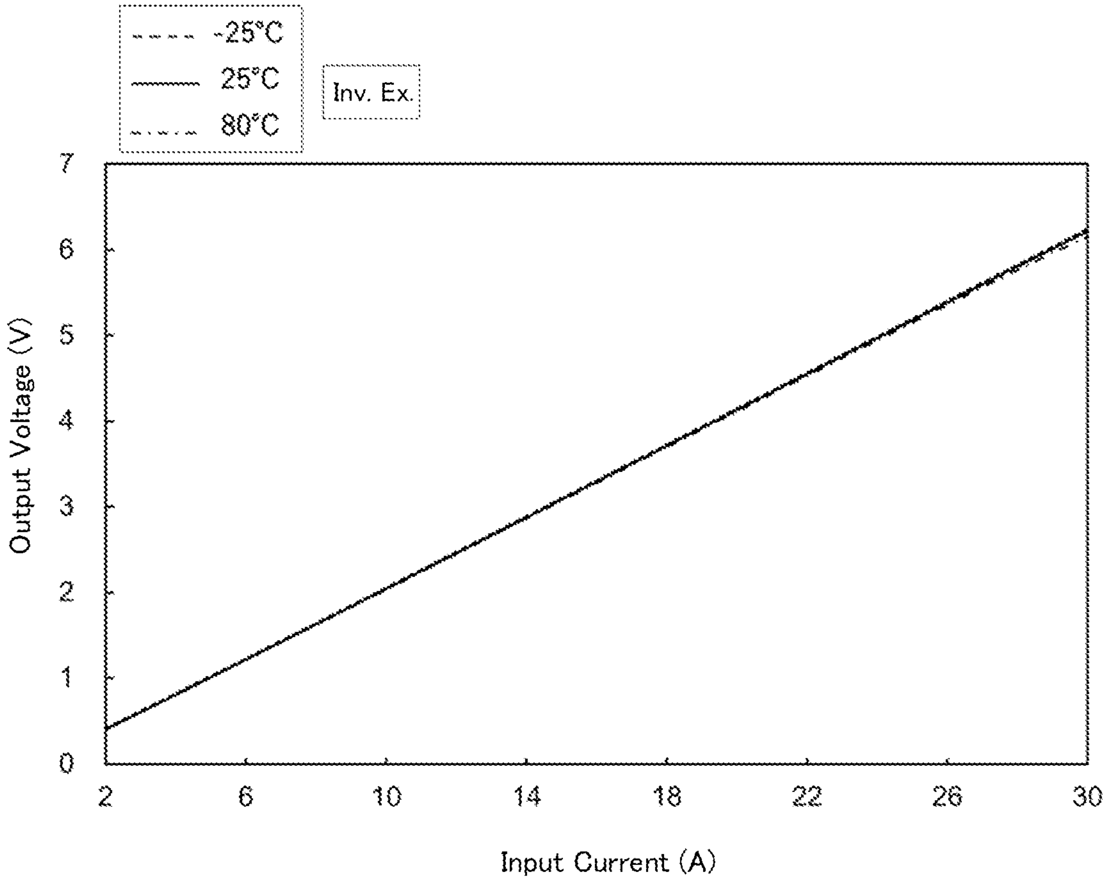
FIG. 25 is a graph (EXAMPLE 1) showing the output voltage characteristics of Inventive Example at −25° C., 25° C., and 80° C.

For the current transformer of Inventive Example, the output voltage (V) was measured by varying the input current (A) under temperature atmosphere at −25° C., 25° C., and 80° C. The results are shown in FIG. 25. With reference to FIG. 25, the current transformer 10 of the Inventive Example shows that the output voltage has a proportional relationship to the input current in each temperature atmosphere, thus providing excellent temperature characteristics. With the current transformer 10 of the present invention, E-type core 40 and I-type core 50 bonded to a single-piece core component by welding or crimping are inserted from the first and second directions and then joined by welding to form the current transformer 10, without using varnish, glue, or resin that are subject to thermal expansion or contraction for joining the core 30. Non-use of varnish, glue, or resin can reduce the influence from the thermal expansion or contraction to the greatest extent.

Example 2

Figure 26:
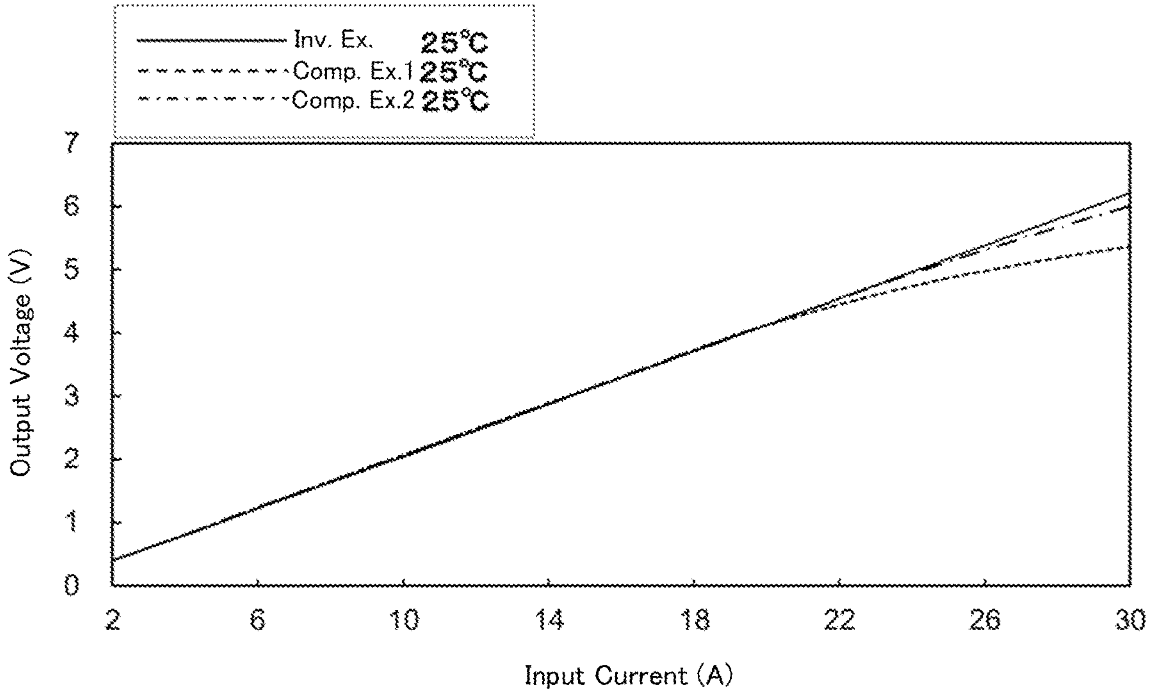
FIG. 26 is a graph (EXAMPLE 2) showing a comparison of the output voltage characteristics between Inventive Example, Comparative Example 1 and Comparative Example 2.

For the current transformer 10 (FIG. 1) of Inventive Example, the current transformer 100 (FIG. 22) of Comparative Example 1, and the current transformer 101 (FIG. 23) of Comparative Example 2, the output voltage characteristics was measured at temperature atmosphere at 25° C. The results are shown in FIG. 26. Referring to FIG. 26, the Inventive Example shows that the output voltage is almost linearly proportional to the input current. However, Comparative Example 1 shows that the output voltage drops on the higher current side. Comparative Example 1 also has a problem of early magnetic saturation because the distal ends of legs of E-type core 40 are open, and the leakage flux between the legs increases. To solve this problem, Comparative Example 1 is required to use a larger sized core. As for Comparative Example 2, E-type core 40 and I-type core 50 are fixed with varnish. The output voltage drops when the core is shifted in position, especially on the higher current side.

Example 3

Figure 27:
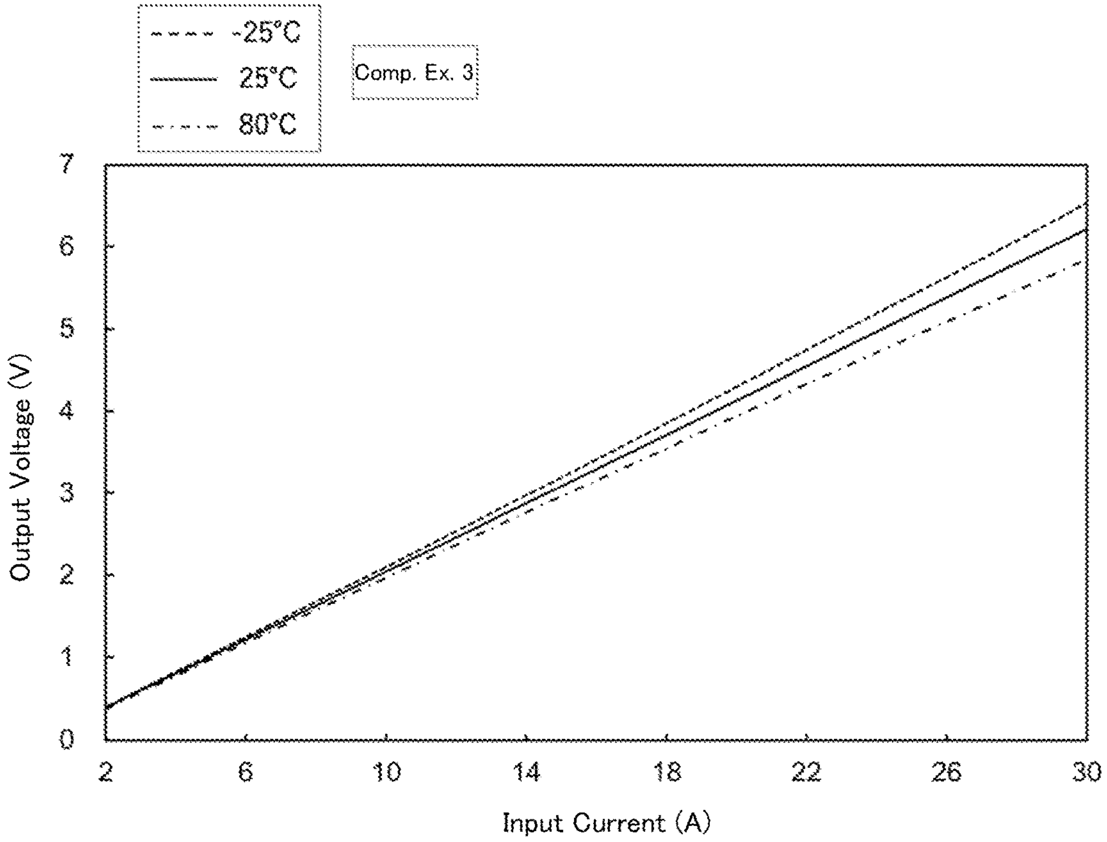
FIG. 27 is a graph (EXAMPLE 3) showing the output voltage characteristics of Comparative Example 3 at −25° C., 25° C., and 80° C.

For the current transformer 102 (FIG. 24) of Comparative Example 3, the output voltage (V) was measured under temperature atmosphere at −25° C., 25° C., and 80° C., as in Inventive Example 1. The results are shown in FIG. 27. With reference to FIG. 27, the current transformer of Comparative Example 3 shows that the output voltage characteristics vary depending on the change in the temperature. This is because the varnish that holds the core 30 in place was subjected to thermal expansion or contraction due to changes in temperature, resulting in that the core 30 expanded linearly and the spacing of the gap between block 103 of E-type core 40 and block 104 of I-type core 50 changed.

The above EXAMPLES 1 to 3 show that the current transformer of the Inventive Example has excellent temperature characteristics than Comparative Examples.

EXPLANATION OF REFERENCE NUMBERS

10 Current transformer
11 Current transformer module
20 Bobbin
21 Hollow section
30 Core
31 Core component
31*a* First core component
31*b* Second core component
40 E-type core
50 I-type core
60 Gap
80 Casing

The invention claimed is:

1. A current transformer comprising:

a resin-made bobbin with a through hollow section, the bobbin having a primary coil and a wire-wound secondary coil; and a core consisting of E-type cores and I-type cores provided in the hollow section of the bobbin, wherein each of the E-type cores is formed of an electromagnetic steel sheet and has three legs extending substantially parallel to each other and a connecting part connected at each end of the legs, and each of the I-type cores is formed of an electromagnetic steel sheet and has the same length as the connecting portion, wherein the E-type cores are stacked with its central leg alternately in opposite directions, and the I-type cores are placed between the connecting parts of the stacked E-type cores, the core comprising a plurality of core components, wherein each of the core components has an E-type core formed by press-punching an electromagnetic steel sheet and has three legs extending substantially parallel to each other and a connecting part at each proximal end of the legs, and an I-type core formed by press-punching an electromagnetic steel sheet and has the same length as the connecting part of the E-type core, the I-type core being placed on and bonded to the connecting part of the E-type core to form a one-piece structure of the E-type core and the I-type core, wherein each of the core components is inserted into the hollow section of the bobbin from a first direction and a second direction opposite to the first direction alternately while interchanging the top and bottom of the core component to form a stack structure of the core components, wherein the E-type core and the I-type core with end faces prepared by the press-punching process have a rounded, slope shaped, sheared surface on their corners, a sheared surface with striations formed in the thickness direction, a fractured surface with unevenness as if the steel sheet was plucked, and a jagged burrs protruding from the end face in the punching direction, the E-type core and the I-type core of each core component are arranged such that the sheared surface and the fractured surface are opposed to each other.

2. The current transformer according to claim 1 wherein the core components stacked in the hollow section of the bobbin are combined into a single core component block.

3. The current transformer according to claim 1 wherein the first core components inserted into the hollow section of the bobbin from the first direction are combined into a single core component block in the stacked state, and the second core components inserted into the hollow section of the bobbin from the second direction are combined into a single core component block in the stacked state.

4. The current transformer according to claim 2 wherein the first core components inserted into the hollow section of the bobbin from the first direction are combined into a single core component block in the stacked state, and the second core components inserted into the hollow section of the bobbin from the second direction are combined into a single core component block in the stacked state.

5. A method of manufacturing a current transformer comprising:

preparing a plurality of core components as defined in claim 1, wherein each of the core components comprises an E-type core having three legs with a central leg between two legs and extending substantially parallel to each other and a connecting part at each proximal end of the legs, and an I-type core having the same length as the connecting part of the E-type core and placed on and bonded to the connecting part of the E-type core, and wherein the E-type core and the I-type core with end faces prepared by press-punching process have a rounded, slope shaped, sheared surface on their corners, a sheared surface with striations formed in the thickness direction, a fractured surface with unevenness as if the steel sheet was plucked, and a jagged burrs protruding from the end face in the punching direction, stacking the core components by inserting the central leg of the E-type core into a hollow section of a bobbin alternately from a first direction and a second direction opposite to the first direction, interchanging the top and bottom of the core component alternately, while arranging the end faces of the E-type core and the I-type core such that the sheared surface and the fractured surface are opposed to each other, adjusting a gap formed between distal ends of the legs of the E-type core inserted from the first direction and end edges of the I-type core inserted from the second direction, and a gap formed between distal ends of legs of the E-type core inserted from the second direction and end edges of the I-type core inserted from the first direction, based on an output voltage characteristics, and integrating the stacked core components into a single core component block.

* * * * *